(12) United States Patent
Foo et al.

(10) Patent No.: US 10,803,061 B2
(45) Date of Patent: Oct. 13, 2020

(54) SOFTWARE VULNERABILITY GRAPH DATABASE

(71) Applicant: Veracode, Inc., Burlington, MA (US)

(72) Inventors: Darius Tsien Wei Foo, Singapore (SG); Ming Yi Ang, Singapore (SG); Jie Shun Yeo, Singapore (SG); Asankhaya Sharma, Singapore (SG)

(73) Assignee: Veracode, Inc., Burlington, MA (US)

(*) Notice: Subject to any disclaimer, the term of this patent is extended or adjusted under 35 U.S.C. 154(b) by 136 days.

(21) Appl. No.: 16/050,109

(22) Filed: Jul. 31, 2018

(65) Prior Publication Data

US 2020/0042628 A1 Feb. 6, 2020

(51) Int. Cl.
*G06F 17/30* (2006.01)
*G06F 16/2453* (2019.01)
*G06F 16/215* (2019.01)
*G06F 16/25* (2019.01)
*G06F 16/22* (2019.01)
*G06F 21/57* (2013.01)

(52) U.S. Cl.
CPC ...... *G06F 16/24549* (2019.01); *G06F 16/215* (2019.01); *G06F 16/2264* (2019.01); *G06F 16/2454* (2019.01); *G06F 16/258* (2019.01); *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 2013/0227695 A1 | 8/2013 | Shankar | |
| 2015/0242637 A1* | 8/2015 | Tonn | G06F 21/577 726/25 |
| 2016/0065599 A1* | 3/2016 | Hovor | H04L 67/20 726/23 |

(Continued)

OTHER PUBLICATIONS

"OVAL—Open Vulnerability and Assessment Language", [online] retrieved on Aug. 8, 2017 from <https://oval.mitre.org>, 2002.

(Continued)

*Primary Examiner* — Brandon S Hoffman
(74) *Attorney, Agent, or Firm* — Gilliam IP PLLC

(57) ABSTRACT

To analyze open-source code at a large scale, a security domain graph language ("SGL") has been created that functions as a vulnerability description language and facilitates program analysis queries. The SGL facilitates building and maintaining a graph database to catalogue vulnerabilities found in open-source components. This graphical database can be accessed via a database interface directly or accessed by an agent that interacts with the database interface. To build the graph database, a database interface processes an open-source component and creates graph structures which represent relationships present in the open-source component. The database interface transforms a vulnerability description into a canonical form based on a schema for the graph database and updates the database based on a determination of whether the vulnerability is a duplicate. This ensures quality and consistency of the vulnerability dataset maintained in the graph database.

20 Claims, 8 Drawing Sheets

(56) References Cited

U.S. PATENT DOCUMENTS

2017/0255544 A1    9/2017   Plate et al.

OTHER PUBLICATIONS

Martin, et al., "Finding Application Errors and Security Flaws Using PQL: a Program Query Language", In ACM SIGPLAN Notices, vol. 40. ACM, 365-383, 2005.
Rodriguez, "The Gremlin Graph Traversal Machine and Language", 2015 Proceedings of the ACM Database Programming Languages Conference, 10 pages, 2015.
PCT Application Serial No. PCT/US2019/044408, International Search Report, dated Oct. 31, 2019, 3 pages.
PCT Application Serial No. PCT/US2019/044408, International Written Opinion, dated Oct. 31, 2019, 8 pages.
PCT Application Serial No. PCT/US2019/044428, International Search Report, dated Oct. 30, 2019, 3 pages.
PCT Application Serial No. PCT/US2019/044428, International Written Opinion, dated Oct. 30, 2019, 7 pages.

\* cited by examiner

SOFTWARE VULNERABILITY GRAPH DATABASE

BACKGROUND

The disclosure generally relates to the field of information security, and more particularly to software development, installation, and management.

Increasingly widespread use of open-source components in software development has correspondingly propagated vulnerabilities affecting the open-source component to downstream applications. Vulnerability description languages have been developed to provide a system for discovering vulnerabilities. Vulnerability description languages can utilize vulnerability datasets that associate discovered vulnerabilities with an identifier and a description. Commonly used vulnerability datasets are centralized and may provide the identifier and description for a vulnerability in plain text.

Some domains compatible with graph computing frameworks are modeled graphically by generating a graph database representing the domain. These graph databases represent data as property graphs: with a series of vertices and edges associated with properties, where directed edges between vertices indicate relationships between entities. Some graph traversal languages enable executing queries on the graph database. Executing queries results in a traversal of the graph database generated from the original domain.

BRIEF DESCRIPTION OF THE DRAWINGS

Aspects of the disclosure may be better understood by referencing the accompanying drawings.

DESCRIPTION

Figure 1:
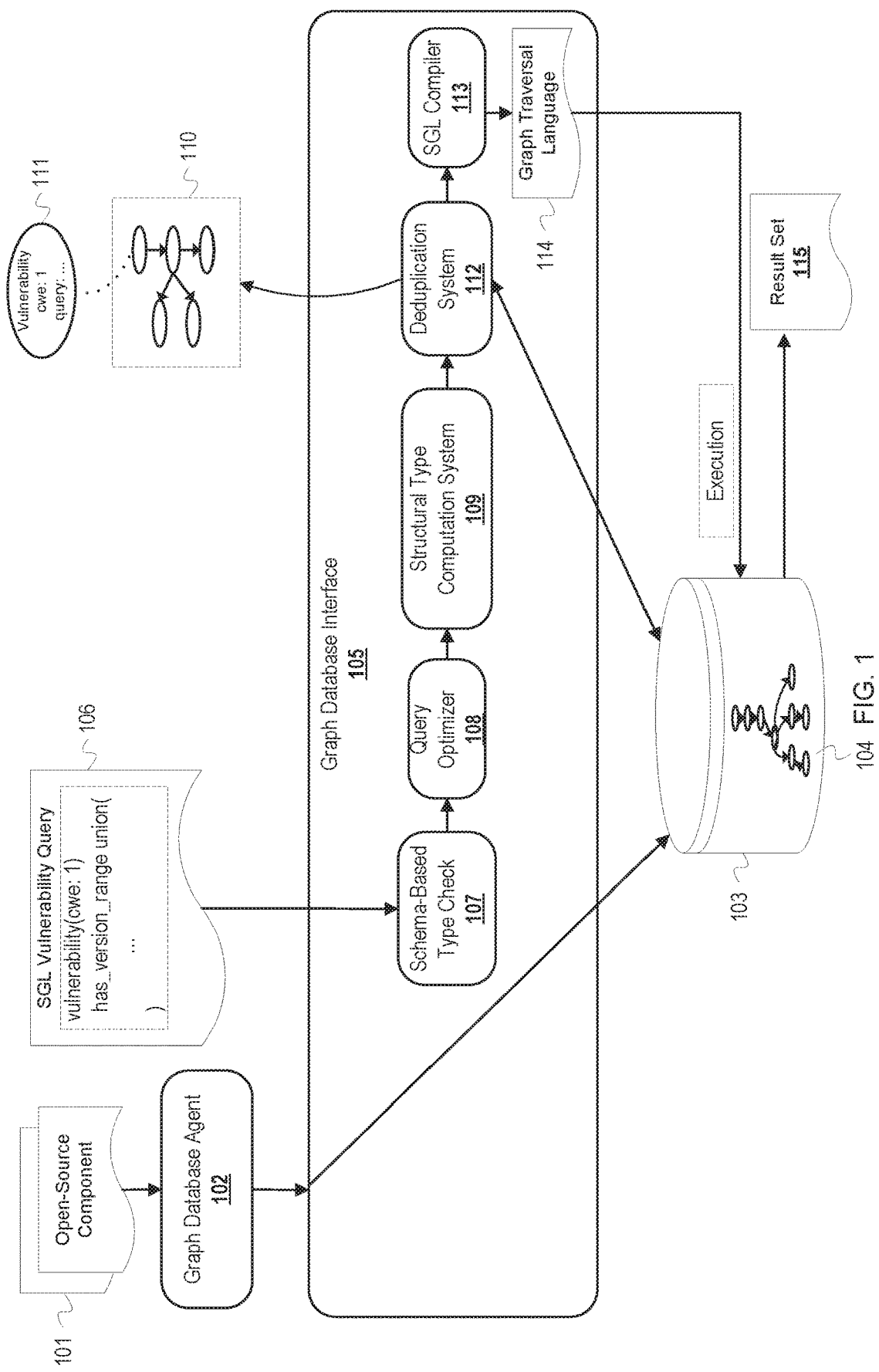
FIG. 1 is a conceptual diagram depicting structural type computation and automatic deduplication of an SGL vulnerability query.

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Terminology

This description uses the term "open-source component" to refer to a standalone open-source code unit (e.g., a single library file, standalone routine or subroutine, etc.) or a collection of open-source code units. A collection of open-source code units may refer to an open-source library having multiple files or a package of files (e.g., compressed collection of files).

Overview

Frequent use of open-source components in software development projects has placed an increasing number of downstream applications at risk of impact by vulnerabilities within the components. Some technologies enable graphical representation of these open-source components and analysis of the resulting graph database. However, duplicate instances of vulnerabilities may arise during documentation. Further, users of current technologies manually choose to execute queries in either an on-line transaction processing ("OLTP") mode or an on-line analytical processing ("OLAP") mode depending on the scope of the graph database that will be accessed, which depends on the user knowing the distinctions between the different execution engines. This knowledge may not be acquired until after a test execution by the user of a query.

To analyze open-source code at a large scale, a security domain graph language ("SGL") has been created that functions as a vulnerability description language and facilitates program analysis queries. The SGL facilitates building and maintaining a graph database to catalogue vulnerabilities found in open-source components. This graphical database can be accessed via a database interface directly or accessed by an agent that interacts with the database interface. To build the graph database, a database interface processes an open-source component and creates graph structures which represent relationships present in the open-source component. The database interface transforms a vulnerability description into a canonical form based on a schema for the graph database and updates the database based on a determination of whether the vulnerability is a duplicate. This ensures quality and consistency of the vulnerability dataset maintained in the graph database.

Prior to query execution for database maintenance or project analysis, an SGL optimizer embodied in the database interface determines the optimal direction of traversal for queries with known starting and ending points based on redundancy calculations for both the query and its reverse. If the reversed traversal yields an improved performance estimate, the query is rewritten to its reverse and is subsequently executed, reducing runtime by as many as several orders of magnitude. An additional analysis before execution automatically determines if a query should be executed in OLTP or OLAP mode by implementing heuristics based on query syntax. This maintains a level of abstraction from the user by allowing the user to query the database without requiring knowledge of which language features correspond to a particular mode of execution.

The following description includes two sections which depict two distinct scenarios of SGL use cases. The first section describes creating and maintaining a graph database with SGL. The second section describes using the graph database and vulnerability database generated with SGL for analysis of software projects that use open source components.

Creation and Maintenance of a Graph Database with SGL

FIG. 1 is a conceptual diagram depicting structural type computation and automatic deduplication of an SGL vulnerability query. FIG. 1 depicts generating a graph database modeling the domain of an open-source component and maintaining the graph database by submitting verified vulnerabilities to the database. Updating the graph database with vulnerability subgraphs as vulnerabilities are identified through SGL queries provides current documentation of vulnerabilities affecting the component.

Prior to processing an SGL vulnerability query 106 from user input, a graph database agent 102 generates a graph database 103 representing the domain of an open-source component 101. Over time, the graph database 103 scope expands with the addition of open-source repositories and/or the addition of individual open-source components. In some embodiments, a crawler searches commit databases of open-source repositories. This search of commit databases enables identification of open-source components that are not represented in the graph database 103. The crawler ignores open-source components which are determined to be present in the graph database 103 from previous additions based on the commit database logs. The remaining open-source components can be added to the graph database 103 upon discovery by the crawler.

The open-source component 101 may have been obtained from a repository using one of a plurality of dependency management tools. The graph database 103 contains data corresponding to the open-source domain organized in an explicit schema. The explicit schema is further detailed in the description of FIG. 3.

Figure 3:
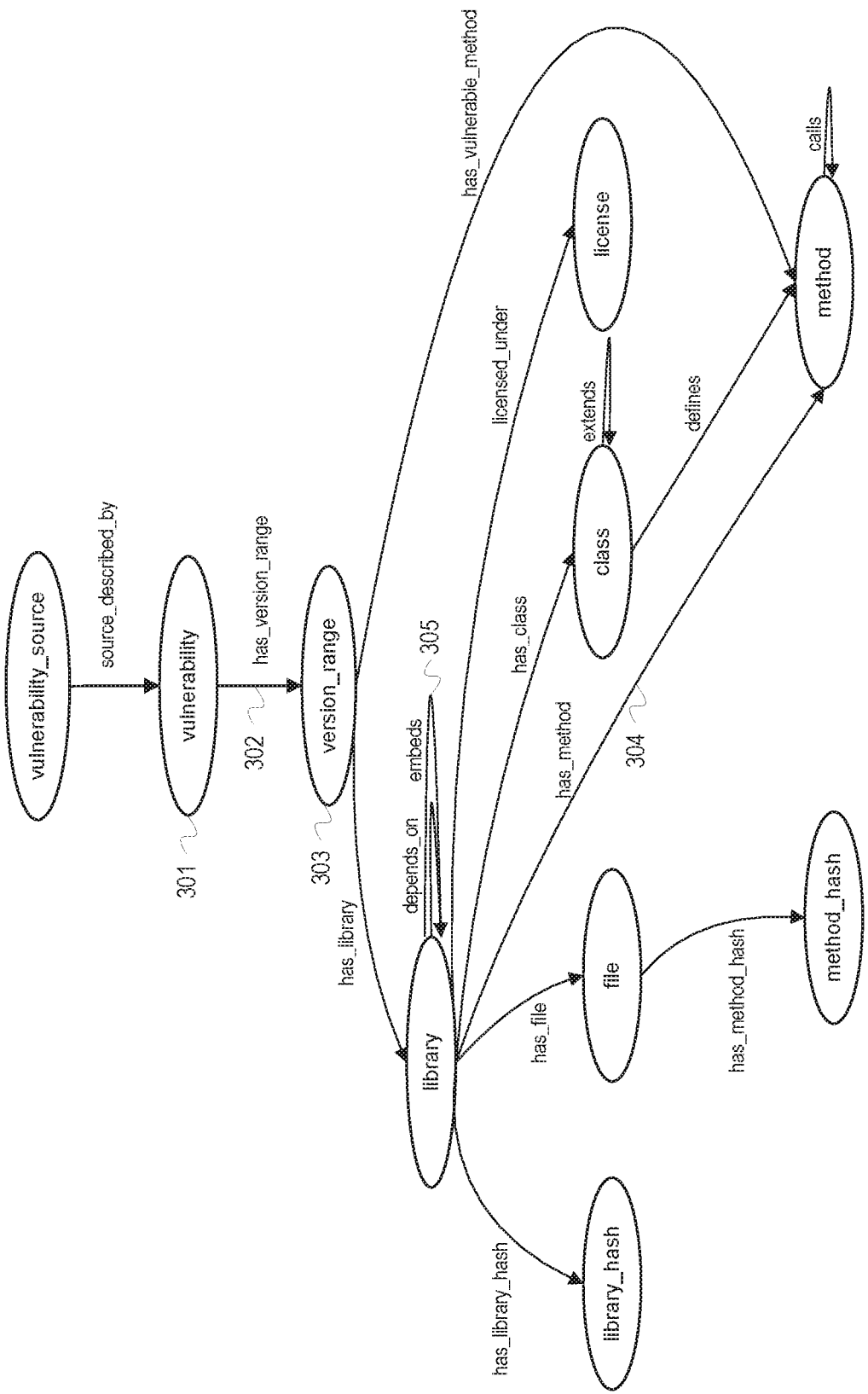
FIG. 3 depicts an example of a graph database schema for the domain of open-source libraries and vulnerabilities.

FIG. 3 depicts an example of a graph database schema for the domain of open-source libraries and vulnerabilities. SGL queries should conform to this explicit schema, and SGL-specific functionality follows from the use of the schema. For instance, schema knowledge allows for the computation of degree centrality data, which results in enabling some SGL queries to be rewritten to their reverse for optimization. A type check prior to query optimization and compilation ensures that SGL queries conform to the schema as to be compatible with this SGL-specific functionality.

The SGL schema organizes vertices and directed edges representing relationships between entities. For example, a vulnerability vertex 301 is connected to a version_range vertex 303 by a directed edge 302 corresponding to the relationship has_version_range. In this example, the directed edge 302 indicates that the vulnerability identified by the vulnerability vertex 301 affects a certain range of versions. The versions are given in the version_range vertex 303. Relationships further down the schema are read in a similar manner.

Edges in the schema are either many-to-one or many-to-many. Many-to-one edges are analogous to a parent-child relationship. For instance, a many-to-one edge 304 connects library and method vertices. The directed edge names a relationship where a library has a certain method, where the method is given by the method vertex. Many-to-many edges connect do not exhibit a parent-child relationship. For example, a many-to-many edge 305 connects library vertices. The directed edge names a relationship where a library embeds another library. One-to-one edges may not be present in the schema, as the vertices that the edge would connect can be combined into a single vertex.

The previously mentioned type checking of queries is done against a set of typing rules. Table 1 below depicts a subset of logical inference rules used for SGL query type checking to ensure a query comports with the explicit schema. The logical inference rules depicted in each row of Table 1 correspond to query steps start, vertex, traversal, aggregation, where, and union rules, respectively.

TABLE 1

Logical Inference Rules for Query Step Type Checking $t_1, \ldots, t_n$: Type
start: $\{t_1, \ldots, t_n\}$
start: $\{t_1, \ldots, t_n\}$ v: $\{t, \ldots\} \rightarrow \{t\}$
start v: $\{t\}$
a: $\{t, \ldots\}$ edge: $\{t, \ldots\} \rightarrow \{u, \ldots\}$
a edge $\{u, \ldots\}$
a: $\{\ldots\}$ count: $\{\ldots\} \rightarrow$ Int
a count: Int
a: $\{t, \ldots\}$ b: $\{t, \ldots\} \rightarrow \{u, \ldots\}$ where: $\{t, \ldots\} \rightarrow$
$(\{t, \ldots\} \rightarrow \{u, \ldots\}) \rightarrow \{t, \ldots\}$
a where(b): $\{t, \ldots\}$
a: $\{t, \ldots\}$ $x_1: u_1, \ldots, x_n: u_n$ union: $\{t, \ldots\} \rightarrow [\{t, \ldots\} \rightarrow$
$\{u_1, \ldots\}, \ldots, \{t, \ldots\} \rightarrow \{u_n, \ldots\}] \rightarrow \{u_1, \ldots, u_n\}$
a union(b): $\{u_1, \ldots, u_n\}$ The typing rules assume the presence of an implicit start symbol at the beginning of an SGL query. The implicit start symbol corresponds to a symbol in the graph traversal language to which SGL is compiled which represents all graph vertices and has as its type the set of all vertex types of the schema.

In addition to the start rule, several examples of rules involved in SGL type checking are rules for vertex, traversal, aggregation, where, and union query steps. The vertex rule for vertex steps involves, for a vertex type t represented by the vertex step v, filtering out vertices which are not of type t. The vertex step v may be seen as a function from a set of types containing at least t to a singleton set containing only t. The traversal and aggregation rules express that both types of steps are functions from their source vertex type to a destination type, which may be either another vertex type or, in the case of a count step, an integer. The where rule expresses that the argument to the step should have the same domain type as the result of the preceding step and that the type of the preceding step is unchanged as a result of the where step. The union rule indicates that steps of multiple types may all be applied to a bag of vertices as long as the source types of the steps all appear. The result type is the union of the destination types. SGL queries which do not conform to these typing rules are not able to be executed.

Returning to FIG. 1, the graph database 103 is organized as a property graph 104 which uses vertices and edges to indicate relationships between entities in the open-source component 101. For instance, the property graph 104 may include a dependency graph generated from the open-source component 101. Vertices and edges contained in the property graph are labeled with properties, or key-value pairs, where the keys are symbols from some alphabet p and the values are Java virtual machine primitives or objects. A label and property key set denotes the type of its associated vertex or edge. The graph database 103 may contain at least one vulnerability subgraph that indicates a vulnerability and details about its underlying cause, such as affected libraries, methods, and version ranges. The graph database 103 can be accessed through the graph database agent 102 or with a graph database interface 105. The graph database interface 105 performs a schema-based type check 107 for the SGL vulnerability query 106 and also includes a query optimizer 108, a structural type computation system 109, a deduplication system 112, and an SGL compiler 113.

The SGL vulnerability query 106 describes a vulnerability that may be present in the open-source component 101 modeled by graph database 103. The SGL vulnerability query 106 is submitted to determine whether the vulnerability should be added to the graph database 103. Prior to executing the SGL vulnerability query 106 on the graph database 103, the schema-based type check 107 determines if the SGL vulnerability query 106 conforms to an explicit schema corresponding to SGL typing rules. With SGL schema typing, vertex and edge types are given by a combination of their label and key from the property graph. The type of a query is given by the set of vertex and edge types which occur in its result set. If the SGL vulnerability query 106 does not conform to this explicit schema, the user should be unable to execute the query.

After checking that the SGL vulnerability query 106 conforms to the SGL schema, the query optimizer 108 optimizes the SGL vulnerability query 106. The query optimizer 108 determines if reversing the direction of traversal on the property graph 104 will improve performance during execution. If the reversed direction of traversal is estimated to improve performance, the query optimizer 108 rewrites the SGL vulnerability query 106 to its reverse. The reverse of the SGL vulnerability query 106 is the representation of the query that yields the reversed direction of traversal identified during optimization. The optimized query which corresponds to either the SGL vulnerability query from user input or its reverse is used for the remainder of the vulnerability query deduplication, compilation, and execution process.

Vulnerability queries from user input are normalized to a canonical representation of an SGL vulnerability in order to maintain consistency in describing vulnerabilities stored in the vulnerability database. Existing centralized vulnerability databases associate instances of vulnerabilities with an assigned identifier for reference. However, the process of assigning identifiers is bottlenecked by limitations of numbering authorities, leaving some vulnerabilities without an identifier. Identifier units may also lack consistency in how they are defined. This may contribute to imprecision and false positives when determining which portions of an open-source component are vulnerable. Additionally, vulnerability representation formats are not consistently machine-readable due to a lack of standardized structure. As a result, deduplication and verification of vulnerabilities represented with these formats may be done manually to ensure accuracy.

SGL functionality described with respect to computing the structural type of vulnerability queries and cataloging vulnerabilities provides for automatic deduplication and verification. Automatic deduplication and verification are possible as a result of normalization of SGL vulnerabilities to a canonical representation for documentation in the vulnerability database. A single vertex property for a vulnerability subgraph contains a string representation of this canonical form for the vulnerability, which reduces the deduplication process to a test for string equality. Vulnerabilities are verified by checking for the presence of affected open-source attributes in the graph database, such as version ranges and libraries. The SGL vulnerability query 106 has a structural type $\tau$ that is computed with the structural type computation system 109. The structural type computation system 109 performs a series of syntactic transformations on the SGL vulnerability query 106. The syntactic transformation may begin by expanding bindings and expanding values in "within" predicates to their cross product. Because ordering should not matter during the structural type computation, arguments present in the transformed query may be given in lexicographical sorted order. This series of syntactic transformations generates a canonical representation of a vulnerability in SGL. This canonical representation of the SGL vulnerability query 106 is serialized to a string and stored in a query property in a vulnerability vertex 111 for a vulnerability subgraph 110 which represents the vulnerability query.

The deduplication system 112 automatically deduplicates vulnerability queries based on the structural type $\tau$. The deduplication system 112 performs a string equality test on the serialized structural types for each vulnerability subgraph present in the graph database 103 against the serialized structural type computed for the SGL vulnerability query 106. A positive test for equivalence indicates that the SGL vulnerability query 106 is a duplicate and prevents the duplicate vulnerability from becoming reinserted into the graph database 103. Otherwise, the SGL vulnerability query 106 can be verified automatically to determine if its underlying cause is present in the graph database 103.

To verify a vulnerability that is not a duplicate of a vulnerability already represented in the graph database 103, the SGL compiler 113 compiles the SGL vulnerability query 106 to a translation or representation in the graph traversal language 114. The graph traversal language translation 114 of the SGL vulnerability query 106 will be executed on the graph database 103 to produce the result set 115. The result set 115 may contain a series of vertices and edges satisfying the SGL vulnerability query 106. A non-empty result set 115 indicates that the vulnerability described by the SGL vulnerability query 106 could be verified.

If the vulnerability represented by the SGL vulnerability query 106 is verified, the user can submit the vulnerability represented by SGL vulnerability query 106 into the graph database 103. Submitting the vulnerability inserts the vulnerability subgraph into the graph database 103. The structural type associated with the vulnerability should be stored in the query property of the vulnerability subgraph that is inserted into the graph database 103. Future vulnerability queries with the same structural type as the SGL vulnerability query 106 will detect the vulnerability in the graph database 103 and will thus prevent reinsertion of the vulnerability subgraph. The functionality of vulnerability verification and insertion into the graph database with SGL permits community-submitted vulnerability entries to be reflected in the graph database with a structure that is consistent throughout submissions. The graph database agent 102 can also submit vulnerability queries to the graph database interface 105 for identification and verification. Vulnerabilities discovered through agent-submitted vulnerability queries are verified and inserted into the graph database 103 as described above.

Graph Database Analysis

Figure 2:
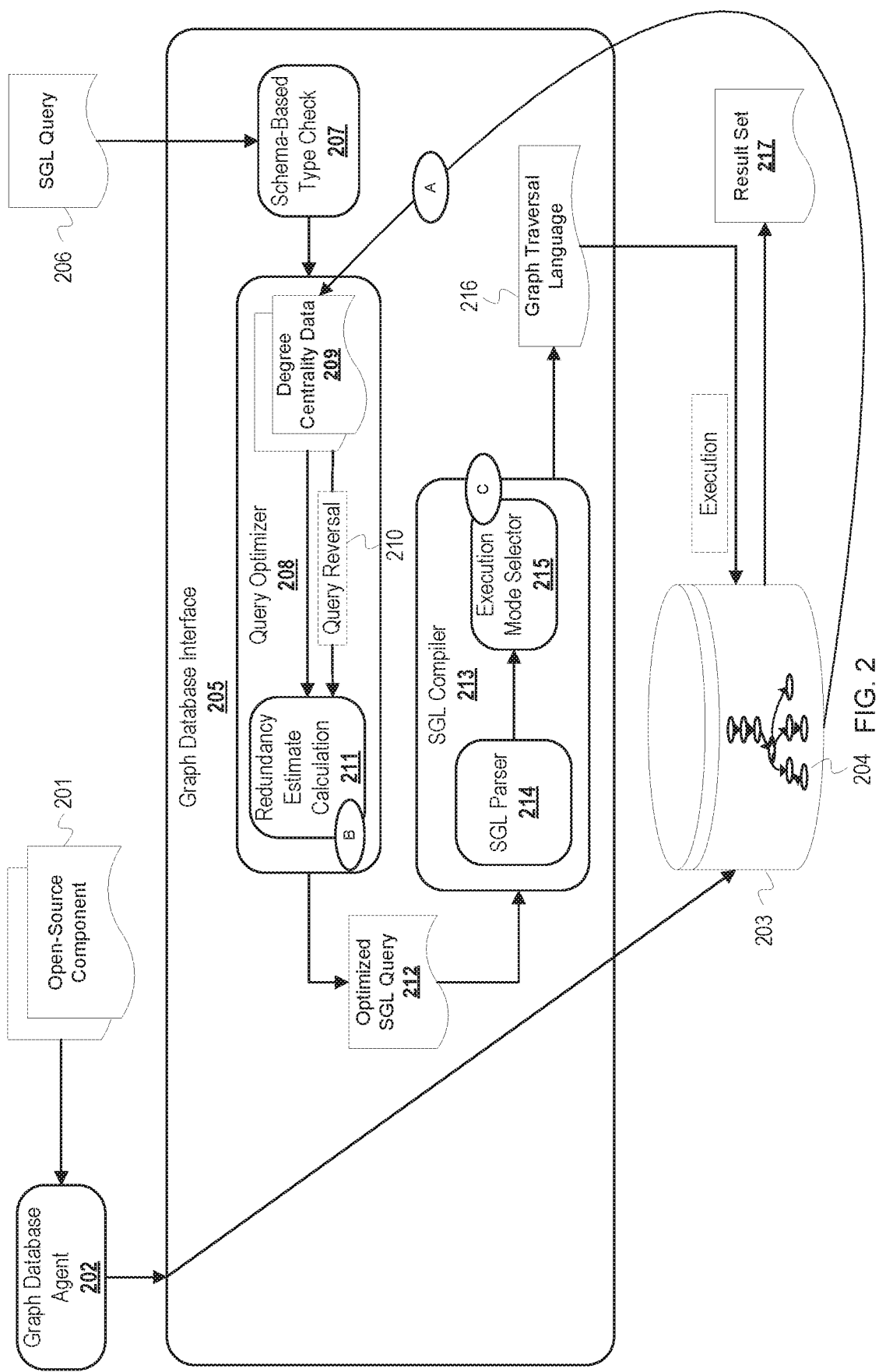
FIG. 2 is a conceptual diagram depicting optimization and compilation of an SGL query for analysis of an open-source domain.

FIG. 2 is a conceptual diagram of optimization and compilation of an SGL query for analysis of a project that includes an open-source component. FIG. 2 depicts submitting a query for large-scale analysis to determine impact of an open-source component upon a utilizing project. For instance, SGL supports queries that enable the user to find inherited and embedded vulnerabilities stemming from an open-source component. Queries operate on a graph database which models the open-source component. The graph database may also contain documentation of vulnerabilities known to affect the open-source component. Updates to the graph database and its associated vulnerabilities occur using the process described with reference to FIG. 1.

Prior to processing an SGL query 206, an existing graph database agent 202 has generated a graph database 203 representing the domain of an open-source component 201. As described with reference to FIG. 1, the graph database may be created and/or expanded through various means, such as a crawler that searches commit databases of open-source repositories.

As also described with reference to FIG. 1, the open-source component 201 may have been obtained from a centralized repository using one of a plurality of dependency management tools. The graph database 203 contains data corresponding to the open-source domain organized in an explicit schema. The graph database 203 is organized as a property graph 204 which represents relationships between entities in the open-source component 201 with a series of vertices and edges. For instance, the property graph 204 may in part indicate dependencies identified in the open-source component 201. Vertices and edges contained in the property graph are labeled with properties, or key-value pairs, where the keys are symbols from some alphabet p and the values are Java virtual machine primitives or objects. A label and property key set denotes the type of its associated vertex or edge. The graph database 203 can be accessed through the graph database agent 202 or with a graph database interface 205. The graph database interface 205 performs a schema-based type check 207 for the SGL query 206 and also includes a query optimizer 208 and an SGL compiler 213.

The graph database agent 202 can generate a vulnerability report for a software project that uses open-source components. The graph database agent 202 performs a scan of the project to generate a call graph and dependency graph describing the software project. The graphs are used to identify the portions of the project that use open-source components. Once the open-source components in the project have been identified, the graph database agent 202 searches the graph database 203 for vulnerabilities that have been catalogued in the graph database 203 based upon the identified open-source components. The graph database agent 202 presents the user with a report listing the vulnerabilities and the affected open-source components used in the project that were found. This functionality enables users to identify vulnerable portions of the project.

To search the graph database for vulnerabilities, the graph database agent 202 generates and submits an SGL query for each of the identified open-source components used in the software project. FIG. 2 depicts the agent 202 generating and submitting the SGL query 206 for an identified open-source component. The SGL query 206 indicates an analysis of the open source component 201 to perform via traversal of the property graph 204. For example, the SGL query 206 may indicate a search for inherited and embedded libraries based on dependencies of a vulnerable library. In some embodiments, the SGL query 206 may be obtained from user input. The SGL query 206 may have been previously written and cached ("filed") by the agent 202 to the interface 205 during an analysis scan of the graph database 203. The graph database 203 may also contain documentation of user-submitted vulnerabilities that have been discovered in the open-source component 201 through previous vulnerability queries.

As similarly described with reference to FIG. 1, a schema-based type check 207 determines if the SGL query 206 conforms to a particular SGL schema. With the SGL schema typing, vertex and edge types are given by a combination of their label and key from the property graph. The type of a query is given by the set of vertex or edge types which occur in its result set. Using this explicit schema with known types enables SGL to perform schema-specific operations, such as error checking and query optimization. If the SGL query does not conform to the schema, the query does not execute. Previously filed queries that have already passed type-checking would skip this evaluation. The explicit schema is further detailed in the description of FIG. 3.

A query optimizer 208 computes and stores degree centrality data 209 from the graph database 203. The degree centrality data 209 contains the average in-degree edge cardinality and average out-degree edge cardinality for each edge type. Prior to parsing and compiling the SGL query 206, the query optimizer 208 determines if the query can be optimized. Queries can be optimized through reversal if the starting and ending points for the query traversal on property graph 204 are known. For instance, typical reachability queries have definite starting and ending points and therefore can be reversed. If the query can be reversed, the query optimizer 208 determines a query reversal 210, or the traversal resulting from reversing the direction of the property graph path traversed by the SGL query 206 at execution.

The redundancy estimate calculation 211 computes an estimate of redundancy for both the SGL query 206 and the query reversal 210. The redundancy of a query is defined as the number of vertices reachable from some starting set $v_s$ that do not eventually have a path to some ending set $v_e$ without going back along an edge already traversed. Queries with lower redundancies exhibit faster execution times and lower memory usage. Redundancy estimates are calculated from the in-degree and out-degree averages stored in the degree centrality data 209 by calculating a cumulative product from each edge in the query's path of traversal. If the redundancy estimate calculation 211 estimates a lower redundancy for the query reversal 210, the query optimizer 208 rewrites the SGL query 206 to its reverse.

The SGL compiler 213 includes an SGL parser 214 and an execution mode selector 215. The SGL parser 214 parses the optimized SGL query 212. During compile time, the execution mode selector 215 performs a syntactic analysis of the parsed query to select between the OLAP and OLTP modes of execution based on a plurality of heuristics. Heuristics are based on particular language features that are specific to either the OLAP or OLTP execution engine. For example, queries containing the construct "where" are executed in OLTP mode. Queries containing a transitive step such as "calls*" are executed in OLAP mode. If the optimized SGL query 212 does not contain any particular language features corresponding to a respective mode of execution, the execution mode selector 215 may perform a cost analysis of the query and select the mode with a lower estimated cost. For instance, though a query may be compatible with either mode of execution, a deep query yields improved performance when executed in OLAP mode. The cost analysis for queries that are potentially deep queries may include calculating the length of the succession of steps present in the query. If the length is above a certain threshold indicated by the heuristics, the query is determined to be a deep query, and the execution mode selector 215 chooses OLAP mode. After selecting a mode, the parsed query is compiled to a graph traversal language 216 and executed with the execution engine corresponding to the mode of execution selected by the execution mode selector 215. Executing the optimized SGL query 212 that has been translated to a graph traversal language 216 produces a result set 217 as an output which contains the set of vertices and edges that satisfy the query.

FIG. 2 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

During stage A, the query optimizer 208 uses the graph database 203 to compute the degree centrality data. The explicit schema that should be used with SGL enables computation of degree centrality data by enforcing the use of known edge types that consistently connect the same vertex types. For each type of edge in the property graph 204, the optimizer calculates the average in-degree cardinality and the average out-degree cardinality and stores the averages corresponding to each edge type in a data structure.

Before calculating the redundancy estimate, edges are stratified into many-to-one and many-to-many categories to facilitate computation. Many-to-one edges are analogous to parent-child relationships, where traversing from the child to the parent exhibits no redundancy, as the directed edge connects to a single child vertex. Traversing many-to-one edges from the child vertex to the parent vertex is preferable to the reverse. Many-to-many edges do not exhibit this parent-child relationship. The two categories of edges in the SGL schema are depicted in FIG. 3.

Once degree centrality data has been obtained, at stage B, the redundancy estimate calculation 211 calculates an estimated redundancy. The estimated redundancy is computed for the edges in the path traversed on the property graph 204 by the SGL query 206 in both the forward and reverse directions. The cardinalities of both the average in-degree and average out-degree are considered when calculating the redundancy. The redundancy estimate calculation 211 generates this result by multiplying average edge cardinalities on the path using the average edge cardinality corresponding to the appropriate direction of traversal.

Following the estimate calculation, the redundancy calculations for the SGL query 206 and the query reversal 210 are compared. If the query reversal 210 yields the lower estimate, the SGL query 206 is rewritten to its reverse. The reverse of the SGL query 206 is the query that, when executed, gives the property graph traversal represented by query reversal 210. Otherwise, the SGL query 206 is unaltered. The query optimizer 208 outputs the optimized SGL query 212 to be compiled and executed, where the optimized SGL query 212 is the query corresponding to the direction of property graph traversal with a lower estimated redundancy.

Stage C occurs at compile time. At stage C, the execution mode selector 215 performs an analysis of the query syntax to determine if the optimized SGL query 212 should be executed in OLTP mode, which uses an OLTP execution engine, or OLAP mode, which uses an OLAP execution engine. The underlying graph database 203 upon which SGL is implemented supports functionality of both execution engines. This enables the execution mode selector 215 to maintain a level of abstraction from the user by automatically selecting between the two execution engines in the underlying implementation of the graph database following an analysis of the optimized SGL query 212.

The execution mode selector 215 first performs a heuristic analysis of the syntax of the optimized SGL query 212. The implemented heuristics indicate which of certain language features correspond to a respective mode of execution. The execution mode selector 215 should select OLTP mode if expressive constructs, such as "where," are required. The execution mode selector 215 should select OLAP mode if the optimized SGL query 212 is a scan query that does not begin at a known point or a deep query that contains a transitive step, a succession of steps with a length above a certain threshold, or an estimated accumulated cardinality that is above a certain threshold. For example, the query "library(_) count" starts at all libraries and returns the total number of libraries in the database and is thus a scan query that will be executed in OLAP mode.

If the heuristic analysis of the optimized SGL query 212 syntax does not indicate the presence of language features corresponding to a particular execution mode, the query can be executed in either mode. Deep queries that access larger subsets of the database are more appropriate for OLAP mode, and queries that utilize expressive language constructs and access a limited subset of the database are more appropriate for OLTP mode. The execution mode selector 215 performs a cost analysis to determine which mode is appropriate for the optimized SGL query 212 based on either querying being available after heuristic analysis. The cost analysis determines if the query is a deep query that should be executed in OLAP mode, as executing deep queries in OLTP mode exhibits a high cost of execution. To identify deep queries that do not contain OLAP-specific language features, the execution mode selector 215 determines a threshold for the length of a succession of steps involved in executing a query and a threshold for estimated accumulated cardinality for the query traversal. The execution mode selector 215 calculates the length of the succession of steps resulting from executing the query and/or the estimate of accumulated cardinality from the query traversal. Calculations are compared to the threshold, and if the calculated values are above the threshold, the query is considered to be a deep query that should be executed in OLAP mode. Otherwise, the query can be executed in OLTP mode without hindering performance. The execution mode selector 215 chooses the appropriate mode based on the results of the cost analysis.

In addition to building the vulnerabilities database and using it for project analysis, the vulnerabilities database can use itself to expand upon the vulnerabilities knowledge therein. In some embodiments, the graph database agent 202 performs an analysis of the graph database 203. The analysis occurs after the graph database 203 has been generated and updated with any vulnerability subgraphs. The analysis functions as a scan of the graph database 203 without prompting the user for specific SGL queries. The graph database agent 202 files SGL queries to the graph database interface 205 which use the same SGL graph engine as queries from user input, such as SGL query 206. The optimization and compilation processes occur as described previously.

Graph database analysis queries filed by the graph database agent 202 to the graph database interface 205 enable large-scale and comprehensive vulnerability analysis of the graph database 203. For instance, the queries filed by the graph database agent 202 may enable a user to identify vulnerabilities similar to those that have been documented in the database based on patterns present in the catalogued vulnerabilities by generalizing vulnerability queries. For instance, keyword arguments can be added to or removed from queries for known vulnerabilities to result in identification of interactions between methods and classes that may also contain vulnerabilities. The queries filed by the graph database agent 202 may serve to find inherited and embedded vulnerabilities based on implicit dependencies. Queries can produce an estimate of the impact of known vulnerabilities in the open-source ecosystem. Queries may also yield suggestions for safe dependency upgrades if a vulnerability affecting a library is in a transitive dependency. The graph database agent 202 may additionally file queries that perform an analysis of application programming interfaces ("APIs") used in an open-source component, such as identifying uses of unsafe APIs.

Example Flowchart Illustrations

Figure 4:
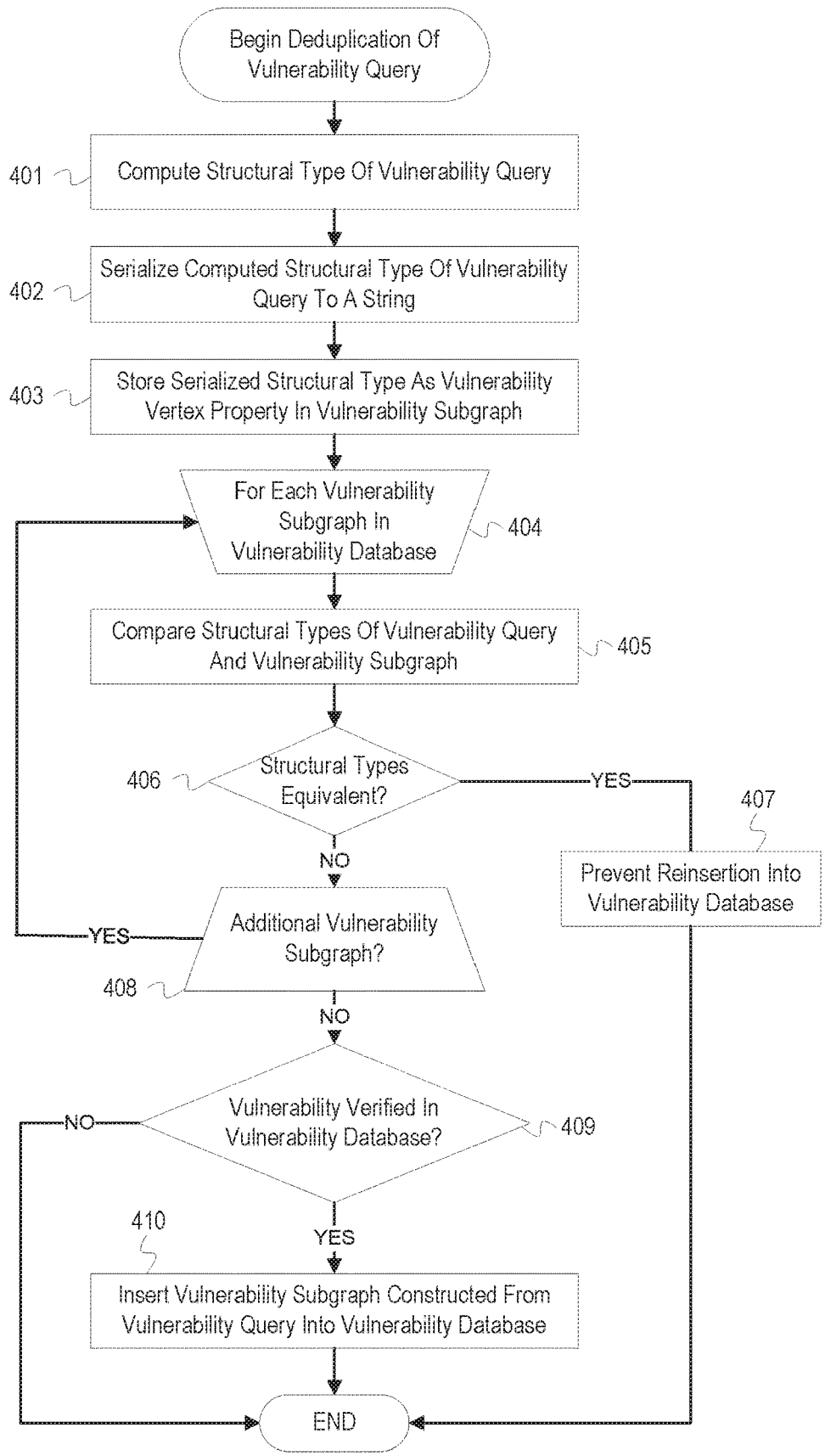
FIG. 4 is a flowchart of example operations for automatic deduplication of queries describing vulnerabilities.

FIG. 4 depicts a flowchart of example operations for automatic deduplication of queries that describe vulnerabilities. For consistency with FIG. 1, the description of FIG. 4 refers to a structural type computation system ("STCS") and a deduplication system performing the operations. Computation of the structural type and deduplication may occur using the optimized representation of the SGL vulnerability query.

Vulnerability queries utilize a subset of SGL in which the query may indicate vulnerability, version_range, method, and library vertices, has_version_range, has_library, and has_vulnerable_method edges, and "eq" and within" predicates. The vulnerability query begins at a vulnerability vertex. The STCS computes the structural type of the vulnerability query conforming to this subset of SGL through a series of syntactic transformations, which generates a canonical representation of a vulnerability with respect to its format for documentation in a vulnerability database (401). Generating the canonical representation of a vulnerability query normalizes the query from user input to a standardized description of the vulnerability, which allows for automatic deduplication and verification when documenting vulnerabilities. To syntactically transform the vulnerability query, bindings are expanded. Values in "within" predicates are expanded into their cross product. For example, the SGL syntax library(within('a', 'b'), within('c', 'd')) is expanded to become four library clauses. Arguments are given in lexicographical sorted order, and order does not matter with respect to keyword arguments. The syntactically transformed query is organized as a vulnerability subgraph in accordance with the SGL schema depicted by FIG. 3 and contains vertices for the vulnerability and an affected version range, method, and set of affected libraries associated with the version range. Once the query from user input is transformed, the result is the canonical representation of the vulnerability, or the syntactic normal form of the vulnerability query. The canonical representation of the vulnerability is serialized to a string (402) and stored corresponding to the property "query" in the vulnerability vertex of a vulnerability subgraph containing values obtained from the vulnerability query (403). Computing and storing the structural type for the query facilitates automatic deduplication of vulnerabilities.

For each vulnerability subgraph in a vulnerability database containing known vulnerabilities that have been documented previously (404), the deduplication system compares the serialized structural type stored in the query property of the subgraph vulnerability vertex with the serialized structural type computed for the vulnerability query through a test for string equality (405). A string equality test is sufficient because the syntactically transformed query is the canonical representation of a vulnerability for SGL vulnerability queries conforming to the schema. If the structural types are equivalent (406), the deduplication system detects that the query and the subgraph represent the same vulnerability and are thus duplicates. The deduplication system prevents the vulnerability from becoming reinserted into the graph database (407). Otherwise, the remaining vulnerability subgraphs in the vulnerability database are tested for equivalence with respect to the vulnerability query (408).

If the vulnerability is not identified as representing a duplicate of a vulnerability already present in the vulnerability database, the vulnerability query can be verified to determine if the underlying cause of the vulnerability is present in the graph database (409). Checking for the underlying cause of the vulnerability may include searching for and identifying the affected libraries, version ranges, and methods in the graph database. If the vulnerability can be verified, the vulnerability is documented by inserting the vulnerability subgraph into the vulnerability database (410). Future attempts to insert the vulnerability into the vulnerability database will result in recognition that the vulnerability is already present in the vulnerability database.

Figure 5:
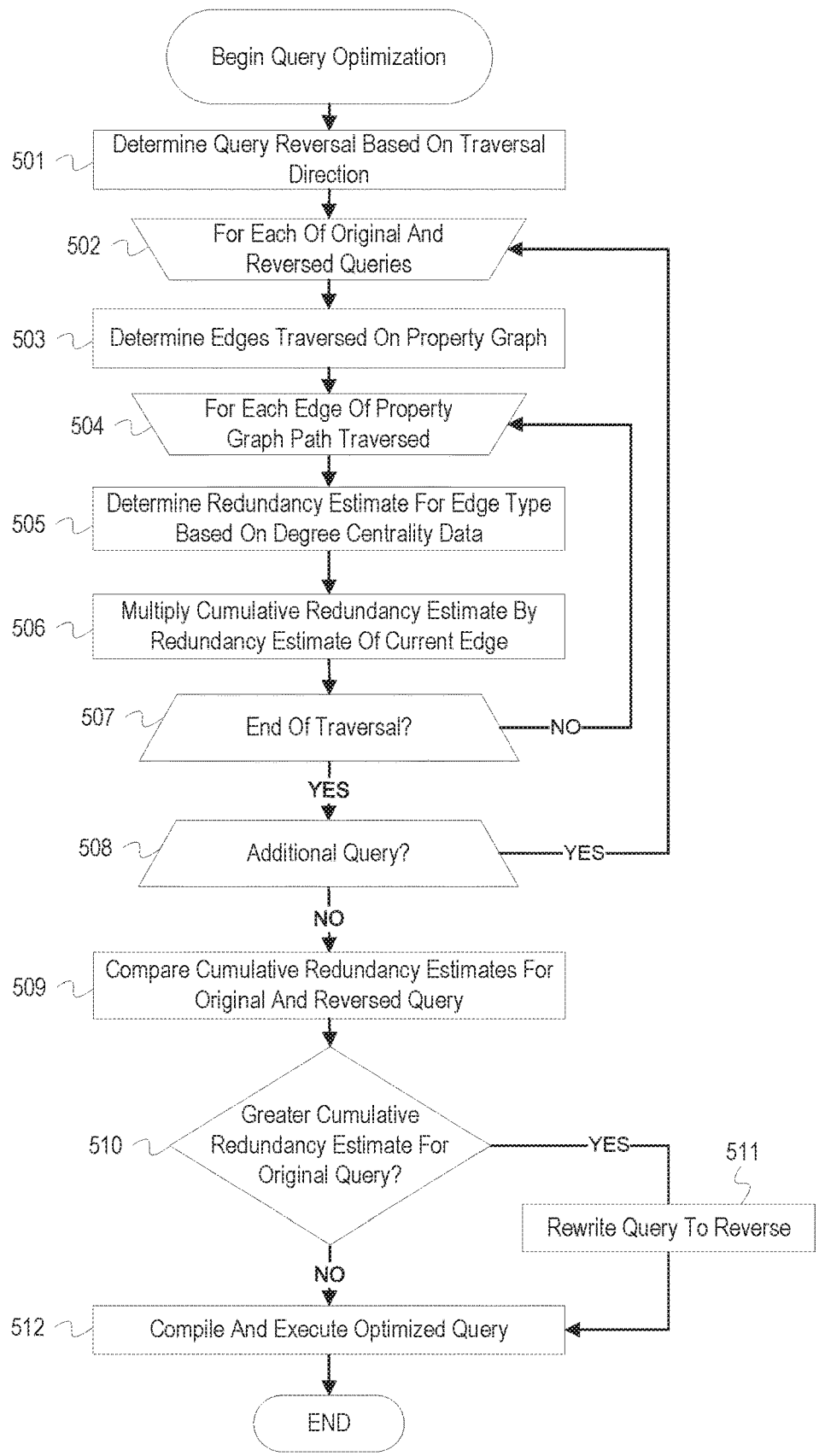
FIG. 5 is a flowchart of example operations for optimizing an SGL query based on degree centrality data.

FIG. 5 depicts a flowchart of example operations for optimizing an SGL query based on degree centrality data obtained from a graph database. For consistency with FIG. 2, the description of FIG. 5 refers to a query optimizer performing the operations. Queries using a subset of SGL containing vertex steps, traversal steps, and where steps as well as predicates are eligible for optimization. Queries conforming to this subset of SGL should have a known starting and ending point so the query can be reversed based on knowledge of the organization of the SGL schema. The flowchart assumes that the query conforms to these guidelines and can therefore be optimized through reversal.

Prior to beginning the optimization process, the query optimizer determines the query reversal by identifying the reversed path of traversal on the property graph from the query's end vertex to the start vertex (501). The reversed path and the forward path contain the same set of vertices visited during traversal. The paths differ in that the direction of each edge is reversed in the path of the query reversal. For each of the two directions of path traversal, forward and reverse (502), the query optimizer determines the edge types on the path of traversal (503). The vertices and edges in the path of traversal are represented in the underlying property graph (i.e., schema based graph that expresses the structure independent of content). Edge types indicate relationships between the vertices they connect. For instance, the edge has_library may connect version range and library vertices. Each edge type has an associated average edge cardinality for its use as an in-degree edge and an out-degree edge. Edge cardinality averages are calculated and stored as degree centrality data prior to execution of SGL queries and after generating or updating the graph database.

For each edge and its associated type on the property graph path of traversal (504), the query optimizer determines the redundancy estimate for the edge based on average in-degree or out-degree edge cardinality for the particular edge type, where the redundancy estimate is the average cardinality for the given direction (505). The averages are obtained from the degree centrality data calculated from cardinalities found in the graph database. The degree centrality data can be calculated in advance and stored as metadata for the vulnerability database. The vulnerability database (i.e., program code that maintains the vulnerability database) can recompute the degree centrality data based on detection of changes to the property graph. The query optimizer will select between the in-degree and out-degree average for the edge according to the direction of traversal in consideration. If the current edge is the first edge in the path, the redundancy estimate for the current edge is set as the cumulative redundancy estimate product. Otherwise, the cumulative redundancy estimate is multiplied by the redundancy estimate of the current edge (506). The query optimizer repeats this calculation for each of the remaining edges to compute the total cumulative product for the traversal (507). The query optimizer computes the cumulative product estimating redundancy of property graph traversal for both the query provided by the user and its reverse traversal (508).

Once the cumulative redundancy estimates for the original and reverse queries have been obtained, the query optimizer compares the calculations (509). The lower redundancy estimate corresponds to the direction of traversal that may exhibit optimal runtime performance. If the cumulative redundancy estimate for the query provided by the user in the original direction of traversal is greater than the cumulative redundancy estimate associated with the reversed direction of traversal (510), the query is rewritten to its reverse (511). The reverse of the query is the query which will yield the reversed direction of traversal that was determined prior to redundancy estimation. Rewriting the query occurs based on knowledge of the SGL schema. The reversed query is then considered to be the optimized version of the query for the remainder of the process, and the original query is no longer considered. Otherwise, the original query remains unaltered and is chosen as the optimized representation of the query. The optimized query is compiled to an existing graph traversal language and executed on the underlying graph database (512).

Figure 6:
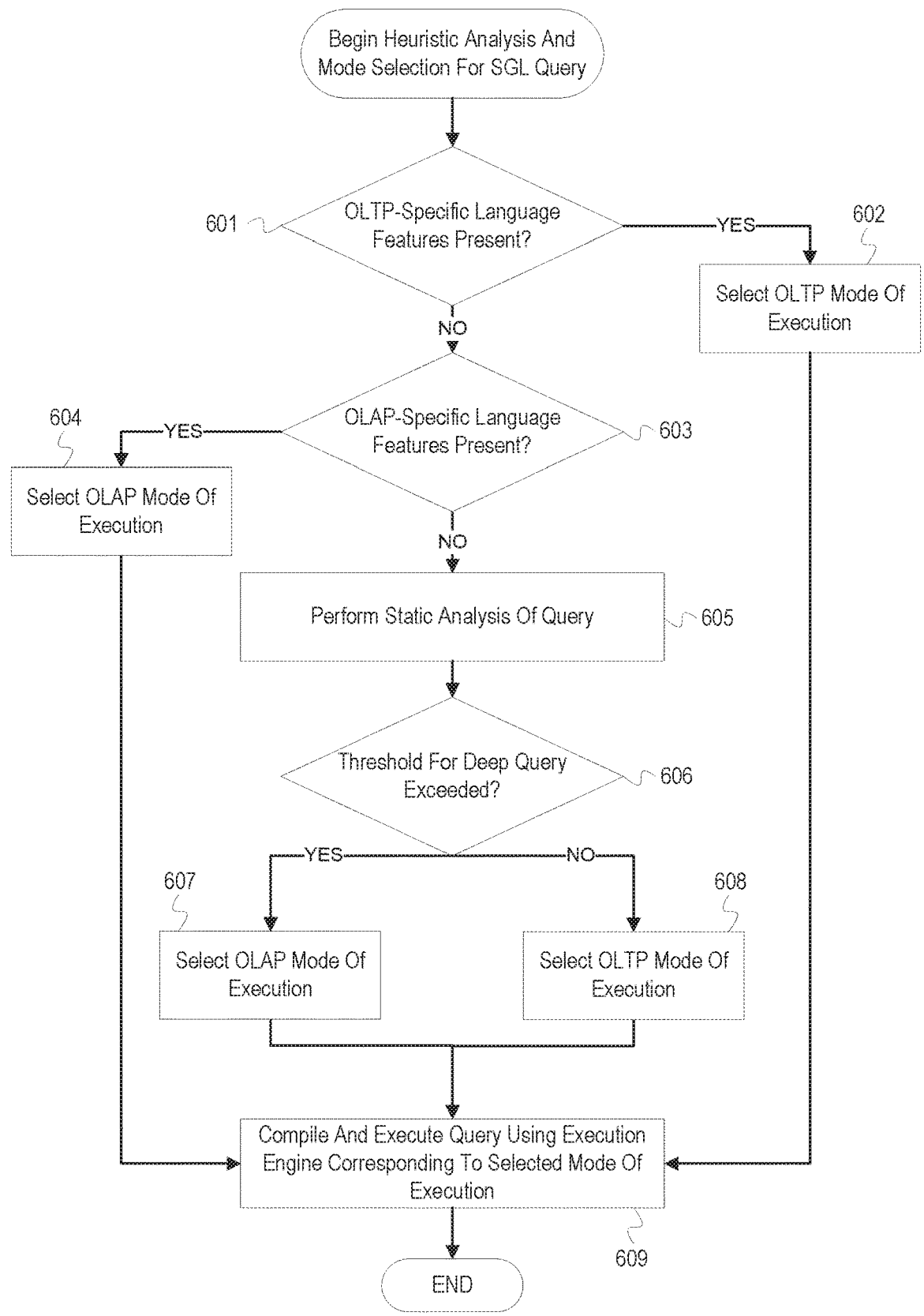
FIG. 6 is a flowchart of example operations for automatically selecting a mode of execution for an SGL query.

FIG. 6 depicts a flowchart of example operations for automatically selecting a mode of execution for an SGL query based on a heuristic analysis of the query syntax. For consistency with FIG. 2, the description of FIG. 6 refers to an execution mode selector performing the operations. If the SGL query has been optimized, references to the SGL query in the description that follows imply that the optimized query is used for the heuristic analysis.

A heuristic analysis is initially performed to determine if the SGL query syntax contains language features corresponding to either the OLAP or OLTP mode of execution. Heuristics are implemented such that the parsed query is analyzed during compilation to an existing graph traversal language. If language features corresponding to OLTP mode are detected (601), the execution mode selector chooses OLTP as the mode of execution (602). Language features corresponding to OLTP mode include expressive constructs or constructs used for simple queries that do not access large portions of the graph database, such as "union" or "where." Queries containing these OLTP-specific features are incompatible with the OLAP execution engine. Otherwise, the syntax will be examined to check if language features corresponding to OLAP are present (603), and if so, the execution mode selector selects OLAP as the mode of execution (604). Language features corresponding to OLAP mode include transitive steps or wildcard flags that indicate a scan of the database. For example, the query "library(_) count" contains a wildcard flag indicating that all libraries in the database are scanned, and the query should be executed in OLAP mode. If the query does not contain language features specific to either execution mode, the query is compatible with both execution engines and thus may be executed in either mode. Operations may be compatible with both execution engines, but the query may be more appropriate for one of the two execution modes depending on the extent of the graph database that operations indicated by the query will act upon.

To determine which mode of execution is preferable for executing the query, the execution mode selector may perform a static query analysis (605). The analysis estimates which of the two execution mode options will result in optimal execution. The analysis determines if the SGL query is a deep query that should be executed with the OLAP execution engine. Deep queries can be identified using a threshold for a length of a succession of steps involved with the query or for an estimate of accumulated edge cardinality. The analysis may include calculating the length of the succession of steps associated with the query or estimating the accumulated edge cardinality as a result of query traversal. The values calculated from performing the analysis are compared with a threshold predetermined by the execution mode selector. If the calculated value exceeds the threshold (606), the query is a deep query with a large or no depth bound, and the mode selector chooses the OLAP mode of execution (607). Otherwise, the query has a limited depth bound and is not a deep query, and OLTP mode is selected (608). Following selection of an execution mode, the SGL compiler compiles the SGL query to a graph traversal language and executes the graph traversal representation of the query with the execution engine that corresponds to the mode selected by the execution mode selector (609). The graph traversal language translation of the SGL query is compatible with both the graph database and the execution engine selected.

Figure 7:
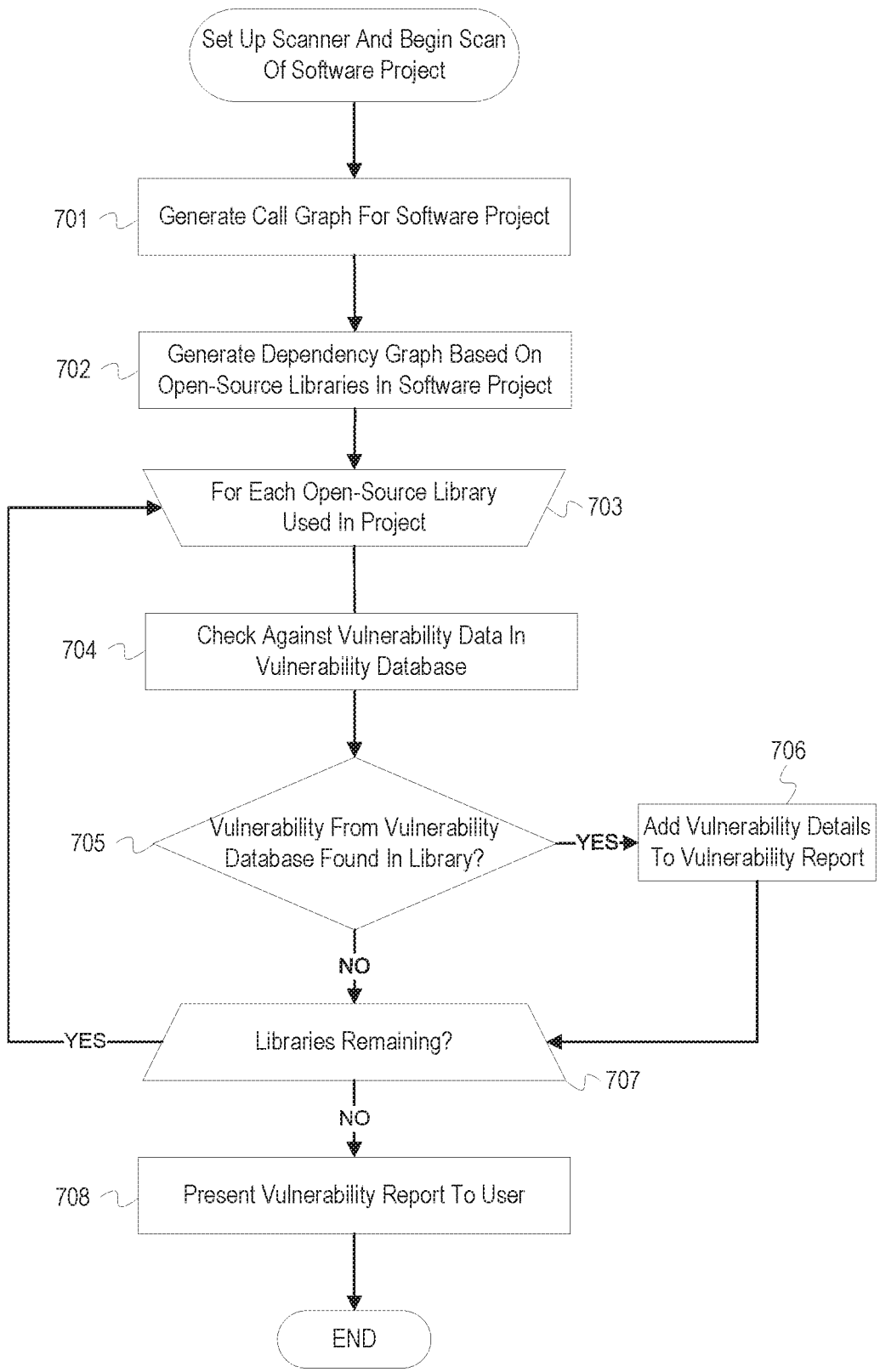
FIG. 7 depicts a flowchart of example operations for scanning a software project to identify open-source components and generating a vulnerability report based on results of the scan.

FIG. 7 depicts a flowchart of example operations for scanning a software project for open-source components and subsequently generating a vulnerability report. The vulnerability report enables a user to identify which portions of a software project contain vulnerable open-source libraries. The scan utilizes a vulnerability database containing descriptions of known vulnerabilities affecting open-source components.

After setting up a scanner and beginning a scan of a software project containing open-source components, the scanner generates a call graph from the software project (701). The scanner uses the call graph to identify open-source components in a project. The scanner traverses the call graph and determines whether a call is made by the project to an open source component. The scanner can analyze attribution information in the project to determine whether a call to a subroutine or routine is a call to an open source component. The scanner can also leverage the vulnerability database to concurrently determine whether the call graph indicates an open source component that has a vulnerability since the vulnerability database will return a result for an open source component with a vulnerability description. The scanner can also evaluate routine/subroutines against databases of open source components.

Based on the open-source components discovered during traversal of the call graph, the scanner determines library dependencies and generates a dependency graph depicting dependencies between open-source libraries used in the software project as well as versions of the libraries used (702). The dependency graph depicts both direct and indirect dependencies between libraries discovered during the scan. For example, the scanner can identify explicit dependencies by searching library declarations in a manifest file associated with the software project. The dependency graph also indicates implicit dependencies between libraries used in the project. The scanner may identify these indirect dependencies by checking for libraries which occur within other libraries. The scanner utilizes the vulnerability database to determine whether the project is impacted by vulnerabilities of the identified open source libraries. For each open-source library used in the project indicated by the dependency graph (703), the scanner searches the vulnerability database (704). To search the vulnerability database, the scanner writes a query or requests a database agent to write a query that identifies the open source library (e.g., library name and version). The vulnerability database contains information about which version ranges or methods within a library are affected by vulnerabilities. The scanner uses this information from the vulnerability database to check against the call graph and dependency graph to identify vulnerable methods and libraries used in the open-source component.

If a vulnerability documented in the vulnerability database is found to affect the library (705), the scanner adds an entry including a description of the vulnerability and the affected library to a vulnerability report that is generated for the project (706). A response to the query will include this description or elements for the description. The entry in the vulnerability report indicates an identifier of the vulnerability and the affected open-source library and version range that is used in the software project. The entry in the vulnerability report may also include results of an impact analysis of the vulnerability relative to the use of the affected open-source components in the software project. To perform an impact analysis, the scanner determines the frequency of use of the vulnerable open-source component in the software project. The scanner generates a count of the instances of use of the vulnerable open-source component within the software project. For example, a count indicating the number of times a method from a vulnerable library is used in a software project will be computed for the vulnerability affecting the library, and the count will be included in the entry for the vulnerability in the vulnerability report. If multiple code units within the software project utilize the vulnerable open-source component, the scanner will generate a count of the number of code units utilizing the vulnerable open-source component. This count is included in the entry for the vulnerability in the vulnerability report. For example, if several distinct code units utilize a method from a vulnerable library, the vulnerability report will identify the vulnerable library used and the number of code units which use it. The vulnerability report will also indicate the location of the code units within the software project. Further, the report will indicate if the vulnerability was discovered in a library exhibiting an explicit or implicit dependency as well as listing the associated dependencies. The scan continues for each of the remaining libraries. After all libraries and library versions indicated in the dependency graph have been scanned (707), the completed vulnerability report containing data indicating all vulnerabilities affecting the open-source components used in the software project as well as the analysis of their impact is provided for the user (708). The final report enables users to identify which portions of the software project are vulnerable to security threats.

Figure 8:
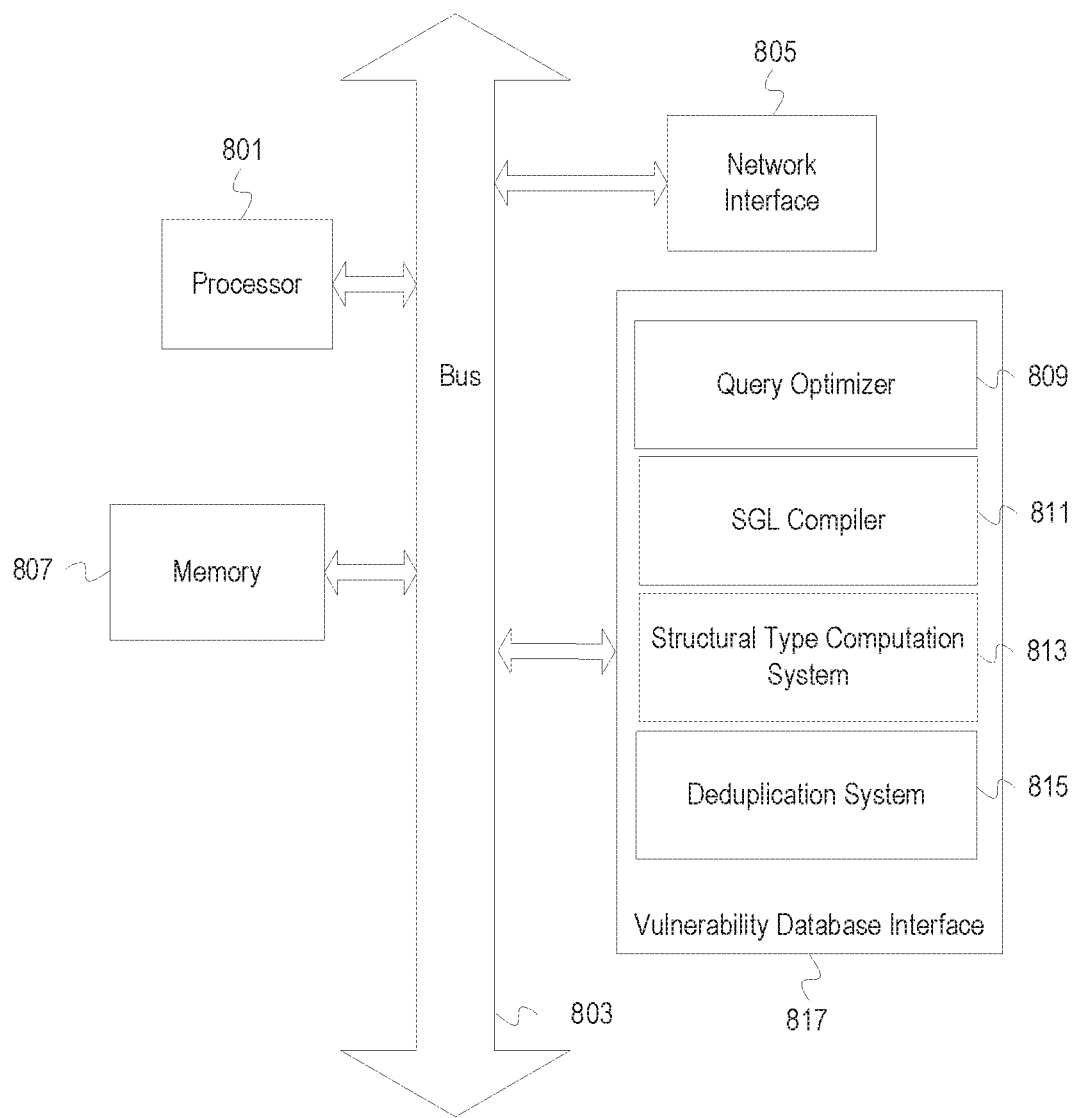
FIG. 8 depicts an example computer system with an SGL compiler, query optimizer, structural type computation system, deduplication system, and vulnerability database interface.

FIG. 8 depicts an example computer system with a query optimizer, SGL compiler, structural type computation system, deduplication system, and vulnerability database interface. The computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, Hyper-Transport® bus, InfiniBand® bus, NuBus, etc.) and a network interface 805 (e.g., a Fiber Channel interface, an Ethernet interface, an internet small computer system interface, SONET interface, wireless interface, etc.). The system also includes the query optimizer 809, SGL compiler 811, structural type computation system 813, deduplication system 815, and vulnerability database interface 817. The query optimizer 809 calculates performance estimates for a query and its reverse for queries determined to be reversible and rewrites the query to the reverse if the reverse is estimated to yield improved performance. The SGL compiler 811 selects a mode of execution corresponding to an execution engine following a heuristic analysis of language features that should be executed by a particular execution engine. The structural type computation system 813 generates a canonical representation of an SGL vulnerability that enables consistent representation of vulnerabilities with the same underlying cause in a graph database for an open-source domain. The deduplication system 815 prevents inserting and documenting duplicate vulnerabilities into the graph database for the open-source domain. The vulnerability database interface 817 processes SGL queries submitted by a user or a graph database agent for analysis of a graph database and contains functionality for completing a vulnerability analysis scan of an open-source project based on queries received from an agent. The vulnerability database interface 817 includes the query optimizer 809, SGL compiler 811, structural type computation system 813, and deduplication system 815. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

The examples often refer to an "execution mode selector." The execution mode selector is a construct used to refer to implementation of functionality for selecting a graph computation engine for execution of a graph database query. This construct is utilized since numerous implementations are possible. An execution mode selector may be a particular component or components of a machine (e.g., a particular circuit card enclosed in a housing with other circuit cards/boards), machine-executable program or programs, firmware, a circuit card with circuitry configured and programmed with firmware for execution mode selection, etc. The term is used to efficiently explain content of the disclosure. The execution mode selector can also be referred to as a graph computation engine selector. Although the examples refer to operations being performed by an execution mode selector, different entities can perform different operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 6, the operations depicted in blocks 601 and 603 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a standalone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for optimizing and deduplicating large-scale graph analysis queries and vulnerability queries in an open-source domain and automatically selecting a mode of execution corresponding to certain language features as well as scanning an open-source project to perform a vulnerability analysis as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
normalizing a first vulnerability description into a canonical form to generate a normalized first vulnerability description, wherein the canonical form is based, at least in part, on a graph database schema that specifies relationships among a vulnerability and software components;
generating a first query for the normalized first vulnerability description with an indication of the normalized first vulnerability description as an attribute or property of a vulnerability vertex of a sub graph;
deduplicating the normalized first vulnerability description based, at least in part, on the first query; and
inserting the normalized first vulnerability description into a vulnerability database based on a determination from the deduplicating that the vulnerability database does not already include the normalized first vulnerability description, wherein the vulnerability database is a graph database that complies with the graph database schema.

2. The method of claim 1, wherein deduplicating the normalized first vulnerability description comprises submitting the first query to determine whether a vulnerability vertex of a subgraph in the vulnerability database already indicates the normalized first vulnerability description.

3. The method of claim 2 further comprising serializing the normalized first vulnerability description into a text string, wherein generating the first query comprises generating the subgraph with the vulnerability vertex having the serialized string as the property or attribute value.

4. The method of claim 1, wherein normalizing the first vulnerability description comprises expanding bindings of the first vulnerability description and organizing the first vulnerability description with expanded bindings into a subgraph representation that conforms to the graph database schema.

5. The method of claim 1, wherein the graph database schema indicates a graph structure comprising a first vertex to represent a vulnerability source, a second vertex to represent a vulnerability, a third vertex to indicate a software component version or version range, a plurality of vertices to represent different types of software components, and edges among the vertices to indicate types of relationships among the vertices.

6. The method of claim 1 further comprising retrieving at least the first vulnerability description from an online repository of open source components.

7. The method of claim 6 further comprising repeating the normalizing, query generating, deduplicating, and deduplicating based inserting for each retrieved vulnerability description.

8. The method of claim 1 further comprising:
based on submission of a second query to the vulnerability database, determining an efficient expression of the second query based on estimates of traversal redundancies computed for the second query and for at least a first rewritten version of the second query, wherein the first rewritten version of the second query has a different traversal direction than the second query and the estimates of traversal redundancies are based on the graph database schema; and
submitting to the vulnerability database the efficient expression of the second query.

9. The method of claim 8, wherein determining the efficient expression of the second query based on estimates of traversal redundancies comprises determining an estimate of traversal redundancy for each of the second query and the first rewritten version of the second query.

10. The method of claim 9, wherein determining an estimate of traversal redundancy for each of the second query and the first rewritten version of the second query comprises accessing degree centrality data to obtain average degree cardinality for each edge type to be traversed for each of the second query and the first rewritten version of the second query, wherein the average degree cardinality is computed in advance based on the graph database schema.

11. The method of claim 8, further comprising determining whether to execute the efficient expression of the second query in on-line transaction processing mode or on-line analytical processing mode based, at least in part, on one of mode specific language features of the efficient expression of the second query and estimated depth of the efficient expression of the second query, wherein the estimated depth is based on a structure of the graph database schema.

12. A non-transitory, computer-readable medium having instructions stored thereon that are executable by a computing device to perform operations comprising:
normalizing a first vulnerability description into a canonical form to generate a normalized first vulnerability description, wherein the canonical form is based, at least in part, on a graph database schema that specifies relationships among a vulnerability and software components;
generating a first query for the normalized first vulnerability description with an indication of the normalized first vulnerability description as an attribute or property of a vulnerability vertex of a subgraph;
submitting the first query to determine whether the normalized first vulnerability description is already indicated in a vulnerability database, wherein the vulnerability database is a graph database that complies with the graph database schema; and
inserting the normalized first vulnerability description into the vulnerability database based on a determination that the vulnerability database does not already include the normalized first vulnerability description.

13. The non-transitory, computer-readable medium of claim 12, wherein the operations further comprise serializing the normalized first vulnerability description into a text string, wherein generating the first query comprises generating the subgraph with the vulnerability vertex having the serialized string as the property or attribute value.

14. The non-transitory, computer-readable medium of claim 12, wherein normalizing the first vulnerability description comprises expanding bindings of the first vulnerability description and organizing the first vulnerability description with expanded bindings into a subgraph representation that conforms to the graph database schema.

15. The non-transitory computer-readable medium of claim 12, wherein the operations further comprise:
obtaining a plurality of vulnerability descriptions from an online repository of open source components, wherein the plurality of vulnerability descriptions comprises the first vulnerability description,
wherein the instructions are executable by a computing device to perform the operations of normalizing, query generating, query submitting, and inserting for each of the plurality of vulnerability descriptions.

16. An apparatus comprising:
a processor; and
a machine-readable medium having program code executable by the processor to cause the apparatus to,
normalize a first vulnerability description to generate a normalized first vulnerability description, wherein the normalized first vulnerability description is based, at least in part, on a graph database schema that includes edges representing different types of relationships among vertices and the vertices at least representing different types of software components, a vulnerability, and a vulnerability source;
generate a first query for the normalized first vulnerability description with an indication of the normalized first vulnerability description as an attribute or property of a vulnerability vertex of a subgraph;
determine with the first query whether the normalized first vulnerability description is already indicated in a vulnerability database, wherein the vulnerability database is a graph database that complies with the graph database schema; and
insert the normalized first vulnerability description into the vulnerability database based on a determination that the vulnerability database does not already include the normalized first vulnerability description.

17. The apparatus of claim 16, wherein the machine-readable medium further has program code executable by the processor to cause the apparatus to:

based on submission of a second query to the vulnerability database, determine an efficient expression of the second query based on estimates of traversal redundancies computed for the second query and for at least a first rewritten version of the second query, wherein the first rewritten version of the second query has a different traversal direction than the second query and the estimates of traversal redundancies are based on the graph database schema; and submit to the vulnerability database the efficient expression of the second query.

18. The apparatus of claim 17, wherein the program code to determine the efficient expression of the second query based on estimates of traversal redundancies comprises program code to determine an estimate of traversal redundancy for each of the second query and the first rewritten version of the second query.

19. The apparatus of claim 16, wherein the machine-readable medium further has program code executable by the processor to cause the apparatus to serialize the normalized first vulnerability description into a text string, wherein the program code to generate the first query comprises program code to generate the subgraph with the vulnerability vertex having the serialized string as the property or attribute value.

20. The apparatus of claim 16, wherein the program code to normalize the first vulnerability description comprises program code to expand bindings of the first vulnerability description and organize the first vulnerability description with expanded bindings into a subgraph representation that conforms to the graph database schema.

* * * * *